United States Patent
Takayama

(10) Patent No.: US 9,501,870 B2
(45) Date of Patent: Nov. 22, 2016

(54) MIXED REALITY IMAGE PROCESSING APPARATUS AND MIXED REALITY IMAGE PROCESSING METHOD

(71) Applicant: CANON KABUSHIKI KAISHA, Tokyo (JP)

(72) Inventor: Tomohiko Takayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 190 days.

(21) Appl. No.: 14/226,726

(22) Filed: Mar. 26, 2014

(65) Prior Publication Data

US 2014/0292811 A1 Oct. 2, 2014

(30) Foreign Application Priority Data

Mar. 29, 2013 (JP) ................................. 2013-074267

(51) Int. Cl.
*G06T 19/00* (2011.01)
*G06T 15/50* (2011.01)

(52) U.S. Cl.
CPC ............. *G06T 19/006* (2013.01); *G06T 15/50* (2013.01); *G06T 2215/16* (2013.01)

(58) Field of Classification Search
None
See application file for complete search history.

(56) References Cited

U.S. PATENT DOCUMENTS

| | | | | |
|---|---|---|---|---|
| 6,885,382 B1* | 4/2005 | Matsuzaki | ............... | G09G 5/02 345/589 |
| 2012/0147163 A1* | 6/2012 | Kaminsky | .............. | G09G 5/028 348/62 |
| 2013/0002698 A1* | 1/2013 | Geiger | .................... | G06T 15/00 345/589 |
| 2014/0002475 A1* | 1/2014 | Oh | ........................ | G06T 7/0012 345/589 |
| 2014/0168243 A1* | 6/2014 | Huang | ...................... | G06T 1/20 345/522 |
| 2014/0198104 A1* | 7/2014 | Tanaka | ................. | H04N 13/026 345/426 |
| 2014/0307007 A1* | 10/2014 | Cho | ...................... | G09G 3/3406 345/690 |

FOREIGN PATENT DOCUMENTS

| | | | |
|---|---|---|---|
| JP | 2002244077 A | 8/2002 | |
| JP | 3423402 B2 * | 7/2003 | ............. G09G 3/002 |
| JP | 2008-216343 A | 9/2008 | |

OTHER PUBLICATIONS

Takemura, Masayuki, Itaru Kitahara, and Yuichi Ohta. "Photometric inconsistency on a mixed-reality face." Proceedings of the 5th IEEE and ACM International Symposium on Mixed and Augmented Reality. IEEE Computer Society, 2006.*
Ichikari et al., "A Challenging Trial to Look-Change of Mixed Reality Space by Relighting", The Virtual Reality Society of Japan, Jun. 2010, pp. 213-220, vol. 15 No. 2.

* cited by examiner

*Primary Examiner* — Jacinta M Crawford
*Assistant Examiner* — Diane Wills
(74) *Attorney, Agent, or Firm* — Canon U.S.A., Inc. IP Division

(57) ABSTRACT

There is provided a mixed reality image processing apparatus capable of forming mixed reality image data that matches an illumination environment of an external world. The mixed reality image processing apparatus includes a standard illumination environment processing unit configured to extract illumination environment information, which indicates the illumination information of the external world, from image data imaged by an imaging unit, and a local illumination environment processing unit configured to convert mixed reality image data, which is formed by combining virtual image data to the image data, into image data corresponding to the illumination environment of the external world based on the illumination environment information.

14 Claims, 13 Drawing Sheets

FIG.8A

| |
|---|
| ILLUMINATION ENVIRONMENT INFORMATION |
| IMAGE IDENTIFICATION INFORMATION (DATE/TIME INFORMATION) |
| COLOR TEMPERATURE INFORMATION |
| LUMINANCE INFORMATION |

FIG.8B

| INFORMATION | | NUMBER OF BITS | REMARKS |
|---|---|---|---|
| DATE | YEAR | 4 | '08 → 1000 |
| | MONTH | 4 | Dec. → 1100 |
| | DAY | 5 | 29 → 11101 |
| TIME | HOUR | 5 | 20 → 10100 |
| | MINUTE | 6 | 36 → 100100 |
| | SECOND | 6 | 42 → 101010 |
| | MILLISECOND | 10 | 666 → 1010011010 |

FIG.8C

| INFORMATION | NUMBER OF BITS | REMARKS |
|---|---|---|
| COLOR TEMPERATURE | 14 | 6500K → 1100101100100 |

FIG.8D

| INFORMATION | NUMBER OF BITS | REMARKS |
|---|---|---|
| LUMINANCE | 8 | Y SIGNAL IN YUV FORMAT |

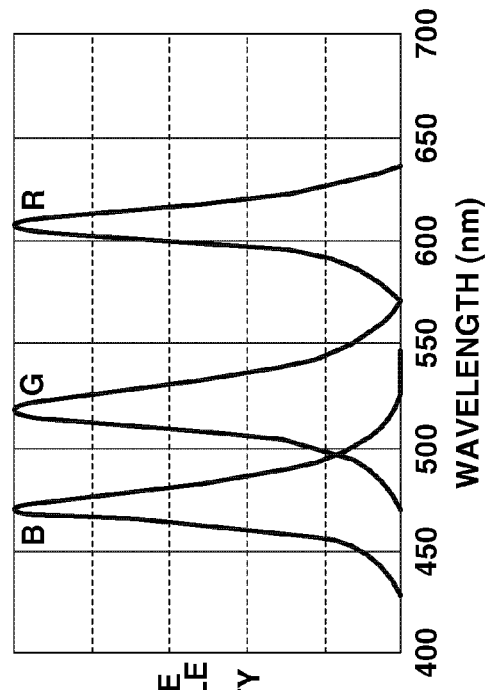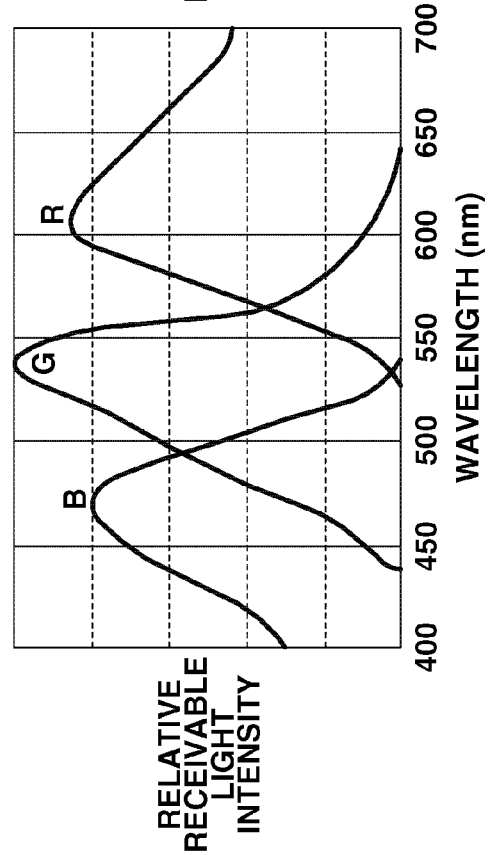

MIXED REALITY IMAGE PROCESSING APPARATUS AND MIXED REALITY IMAGE PROCESSING METHOD

BACKGROUND OF THE INVENTION

Field of the Invention

The present invention relates to a technique for generating mixed reality image data by combining virtual image data to captured image data.

Description of the Related Art

In recent years, a mixed reality technique, i.e., an MR technique has been known as a technique for mixing a real world and a virtual world seamlessly in real time. As one type of the MR technique, there is known a technique that uses a video see-through head mounted display (HMD) to allow an HMD user to observe a mixed reality image. The mixed reality image is created by imaging an object that substantially coincides with an object observed from a line-of-sight position of the HMD user with use of a video camera and the like, and displaying this captured image data with computer graphics (CG) superimposed thereon.

An imaging unit mounted on the video see-through HMD captures observation image data in an external world that substantially coincides with the line-of-sight position of the HMD user. The imaging unit includes two pairs of an image sensor and an optical system for a right eye and a left eye for generating stereo image data, and a digital signal processor (DSP) for performing image processing. A display unit displays the mixed reality image data created by combining CG to the object that substantially coincides with the object observed from the line-of-sight position of the HMD user. Further, the display unit is configured to deal with a pair of images of the right side and the left side like the imaging unit, and includes two pairs of a display device and an optical system for the right eye and the left eye.

A relationship between the external world and the mixed reality image data will be described now. The above-described display unit is configured to display image data input from an external apparatus without making any adjustment thereto. Therefore, even when the external world is at dust, the external world is at noon so that it is extremely bright, or the external world is under a slightly dark environment in the shade of a tree, generally, the mixed reality image data displayed on the display unit is image data unaffected by the environment of the external world around the HMD user, in which a brightness and a color are uniformly adjusted. Therefore, a gap may be generated between brightness and color sensations felt by the HMD user to the ambient environment, and the actual environment of the external world.

This influence cannot be also ignored for an optical see-through HMD. When CG data is superimposed on a see-through image of the external world in the optical see-through HMD, the brightness and the color are uniformly adjusted only in the CG data, whereby the balance and the color are unbalanced between the CG data and the see-through image of the external world. This leads to such a problem that the CG data may have an unnatural brightness and color to the see-through image of the external world depending on the environment of the external world, thereby impairing a realistic sensation.

Under this circumstance, Japanese Patent Application Laid-Open No. 2002-244077 discusses a technique that reduces a shutter speed of an imaging unit and increases a lighting time of an illumination light source of a display unit under a bright environment, while increasing the shutter speed and reducing the lighting time of the illumination light source under a dark environment. With this adjustment, the technique discussed in Japanese Patent Application Laid-Open No. 2002-244077 aims at maintaining the display brightness of the display unit at a brightness that matches see-through light even under various kinds of environments of an external world. Further, the technique discussed in Japanese Patent Application Laid-Open No. 2002-244077 aims at imaging an object while maintaining the brightness within a certain range by changing the shutter speed of the imaging unit according to the brightness of the external world.

Japanese Patent No. 03423402 discusses a technique that detects a color temperature of an external world by a sensor, and adjusts a color balance of display image data to be displayed on a display unit according to the detected color temperature. With this adjustment, the technique discussed in Japanese Patent No. 03423402 aims at generating display image data less unbalanced with see-through light.

However, the techniques discussed in Japanese Patent Application Laid-Open No. 2002-244077 and Japanese Patent No. 03423402 are techniques for adjusting the brightness and color of the display image data according to an illumination environment of the external world, and cannot display mixed reality image data that matches the illumination environment of the external world on the video see-through HMD.

SUMMARY OF THE INVENTION

According to an aspect of the present invention, a mixed reality image processing apparatus includes an extraction unit configured to extract illumination environment information, which indicates an illumination environment of an external world, from image data imaged by an imaging unit, and a conversion unit configured to convert mixed reality image data, which is formed by combining virtual image data to the image data, into image data corresponding to the illumination environment of the external world based on the illumination environment information.

According to the present disclosure, it is possible to generate the mixed reality image data that matches the illumination environment of the external world.

Further features of the present invention will become apparent from the following description of exemplary embodiments with reference to the attached drawings.

BRIEF DESCRIPTION OF THE DRAWINGS

FIGS. 8A, 8B, 8C, and 8D illustrate tables indicating data structures of illumination environment information.

FIGS. 9A, 9B, 9C, and 9D illustrate what kind of characteristics an imaging device and a display device have.

DESCRIPTION OF THE EMBODIMENTS

Various exemplary embodiments, features, and aspects of the invention will be described in detail below with reference to the drawings.

Figure 1:
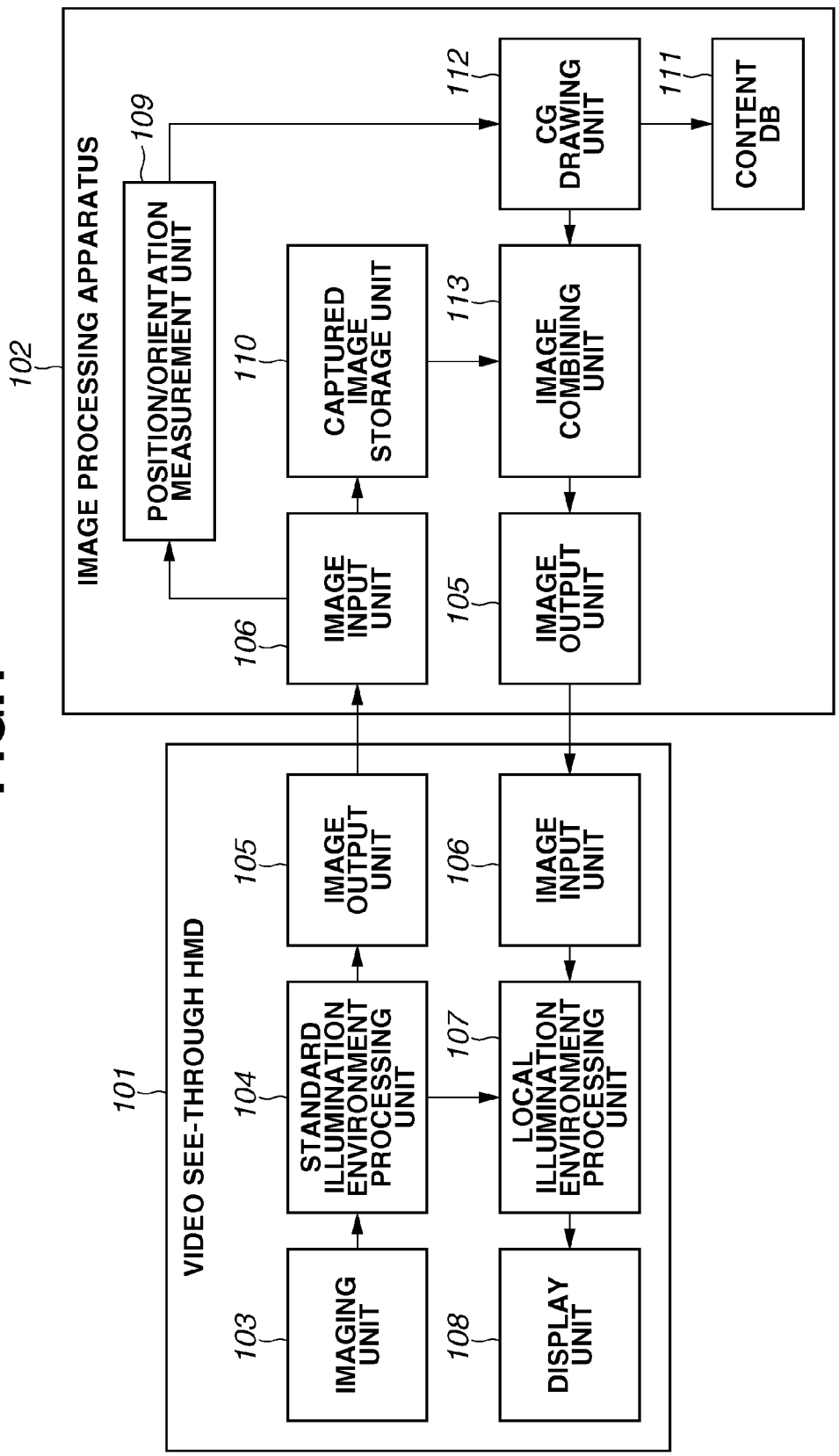
FIG. 1 is a block diagram illustrating a functional configuration of a mixed reality system using a video see-through HMD according to a first exemplary embodiment.

First, a first exemplary embodiment of the present invention will be described. FIG. 1 illustrates a functional configuration of a mixed reality system using a video see-through head mounted display (HMD) 101 according to the first exemplary embodiment. The mixed reality system illustrated in FIG. 1 includes the video see-through HMD 101 according to the first exemplary embodiment. The video see-through HMD 101 includes an imaging unit 103, a standard illumination environment processing unit 104, an image output unit 105, an image input unit 106, a local illumination environment processing unit 107, and a display unit 108. The mixed reality system is configured to use the video see-through HMD 101 as an example of a mixed reality image processing apparatus.

The imaging unit 103 captures image data (hereinafter referred to as captured image data) of an external world that substantially coincides with a line-of-sight position of an HMD user. The imaging unit 103 includes two pairs of image sensor and optical system for a right eye and a left eye for generating stereo image data, and a DSP for performing image processing. A solid-state image sensor, which is represented by a charge coupled device (CCD) image sensor and a complementary metal-oxide semiconductor (CMOS) image sensor, is used for each of the image sensors.

The display unit 108 displays mixed reality image data (MR image data) formed by combining the captured image data and CG. The display unit 108 is configured to deal with images of the right side and the left side similar to the imaging unit 103, and includes two pairs of display device and optical system for the right eye and the left eye. A small liquid-crystal display or a retina scan type device using Micro Electro Mechanical Systems (MEMS) is used for each of the display devices.

The image output unit 105 converts a format of output image data according to an interface between the apparatuses. The image input unit 106 converts a format of input image data according to an interface between the apparatuses. A method that can meet a requirement of a real-time capability and can transmit a large amount of data is used for each of interfaces of the image output unit 105 and the image input unit 106. Examples of such a method include a metallic cable such as a universal serial bus (USB) or Institute of Electrical and Electronics Engineers (IEEE) 1394, and an optical fiber such as Gigabit Ethernet (registered trademark).

Referring to FIG. 1, the mixed reality system includes an image processing apparatus 102. The image processing apparatus 102 includes the image output unit 105, the image input unit 106, a position/orientation measurement unit 109, a captured image storage unit 110, a content database (DB) 111, a CG drawing unit 112, and an image combining unit 113. The image processing apparatus 102 can be embodied by an information processing apparatus that has a high-performance calculation processing function and graphics generation/display function, such as a personal computer (PC) and a workstation.

The position/orientation measurement unit 109 measures position/orientation information that indicates at least any one of a position and an orientation of the HMD user. More specifically, the position/orientation measurement unit 109 extracts a marker and/or a natural feature from the captured image data input from the image input unit 106, and measures the position/orientation information using them. The measured position/orientation information is output as necessary to the CG drawing unit 112 to be used for a calculation of a shape of virtual image data (CG) to be drawn.

The content DB 111 is a database that stores contents of virtual image data. The CG drawing unit 112 draws virtual image data based on the position/orientation information measured by the position/orientation measurement unit 109 and the contents stored in the content DB 111. The captured image storage unit 110 stores the captured image data input from the image input unit 106. The image combining unit 113 combines the captured image data and the virtual image data. It is desirable that the captured image data on which the virtual image data is to be superimposed is captured image data from which the position/orientation information for drawing the virtual image data is detected. However, if the real-time capability is impaired due to a transmission delay between the systems, a processing time required to draw CG, and the like, the mixed reality system may be configured to superimpose the virtual image data onto latest updated captured image data at a timing when the virtual image data is generated. Using a predicted value as the position/orientation information for CG drawing at this time can reduce a time lag between the captured image data and the virtual image data.

Based on this configuration, a flow of image data will be briefly described. The captured image data output from the imaging unit 103 is output to the image processing apparatus 102 and is stored into the captured image storage unit 110, after being processed by the standard illumination environment processing unit 104. Then, virtual image data is superimposed on the captured image data stored in the captured image storage unit 110 by the image combining unit 113. As a result, mixed reality image data is generated. The generated mixed reality image data is output to the video see-through HMD 101 and is processed by the local illumination environment processing unit 107. Then, the mixed reality image data is displayed on the display unit 108.

Figure 2:
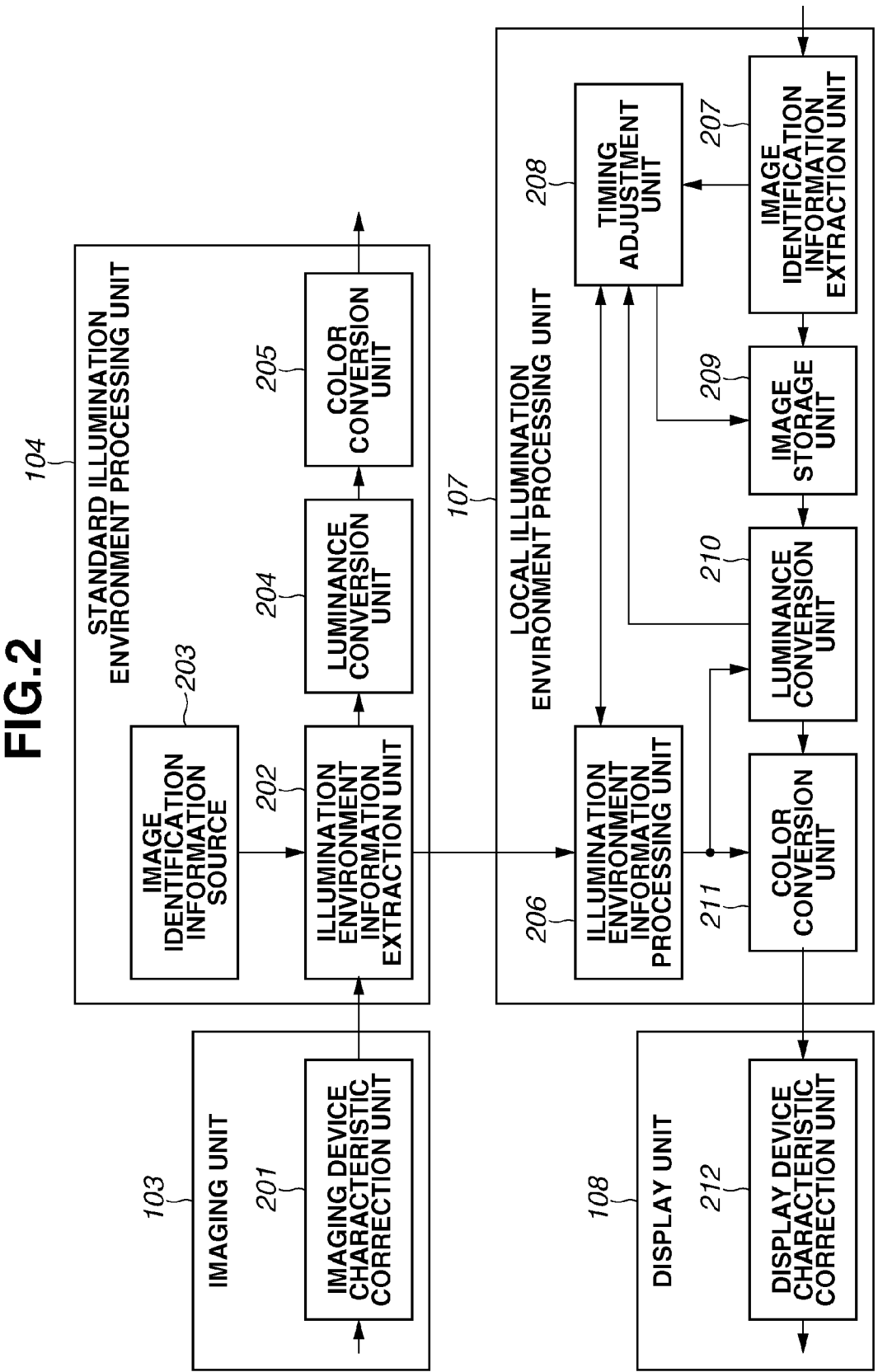
FIG. 2 is a block diagram illustrating a detailed configuration of and around a standard illumination environment processing unit and a local illumination environment processing unit in the video see-through HMD according to the first exemplary embodiment.

FIG. 2 illustrates a detailed configuration of and around the standard illumination environment processing unit 104 and the local illumination environment processing 107 in the video see-through HMD 101.

The imaging unit 103 captures captured image data so as to maintain an actual appearance as much as possible. If the external world is dark, a dark image is captured as the captured image data. If the external world is bright, a bright image is captured as the captured image data. Further, if a color temperature is high in the external world, the captured image data also has a high color temperature. If the color temperature is low in the external world, the captured image data also has a low color temperature. In this manner, the imaging unit 103 performs imaging processing capable of outputting captured image data that matches the external world as much as possible. This does not mean that image data formed by performing an analog-digital (AD) conversion on an analog signal photoelectrically converted by the imaging device without any arrangement made thereto is output as the captured image data that matches the external world. It is desirable to reduce an analog noise by guiding a large amount of light to the imaging device, and correct a luminance by an imaging device characteristic correction unit 201, which will be described below. Further, it is desirable to also correct a color due to a color filter and the like. The imaging unit 103 performs processing that enables the environment of the captured image data to match the external world as the whole unit. The imaging unit 103 includes the imaging device characteristic correction unit 201. The imaging device characteristic correction unit 201 corrects a characteristic depending on an individual imaging device.

As illustrated in FIG. 2, the standard illumination environment processing unit 104 includes an illumination environment information extraction unit 202, an image identification information source 203, a luminance conversion unit 204, and a color conversion unit 205. The illumination environment information extraction unit 202 extracts information that indicates an illumination environment of the external world (hereinafter referred to as illumination environment information), such as color temperature information and luminance information, from the captured image data by performing image processing. Then, the illumination environment information extraction unit 202 outputs the extracted illumination environment information together with image identification information contained in the image identification information source 203 to the local illumination environment processing unit 107. The luminance information here means, for example, information that indicates a Y signal of the captured image data in a YUV format. The color temperature information means, for example, information that indicates a color temperature calculated from a ratio among RGB signal intensities of the captured image data in an RGB format. In addition to the above-described processing, the illumination environment information extraction unit 202 embeds the image identification information into the captured image data by an electronic watermark technique, and outputs it to the luminance conversion unit 204. The image identification information only has to be added as an attribute of the captured image data. Therefore, the image identification information may be added to a header of image data, and the image identification information may be combined or added by a different method depending on a system configuration.

The image identification information source 203 is a collection of image identification information. The image identification information only has to be at least information that allows identification of image data from the time when captured image data is captured to the time when virtual image data is superimposed onto this captured image data. Therefore, if a time period corresponding to 10 frames is required from a capture of captured image data to superimposition of virtual image data onto this captured image data, only image identification information corresponding to the 10 frames should be prepared, so that the image identification information can be expressed by 4 bits. In this manner, the image identification information only has to be information that allows image data to be uniquely identified. For example, as simple methods, the image identification information can be realized by merely numbering captured image data, or can be also realized as a time stamp of a time when captured image data is captured. Actually, how to realize the image identification information and an amount of the information are determined in consideration of factors such as a variation in the time period from a capture of captured image data to superimposition of virtual image data onto this captured image data, and a possibility that the image identification information is also used as information that indicates a date/time when the captured image data is captured.

The luminance conversion unit 204 converts a luminance of the captured image data. The luminance conversion unit 204 adjusts, for example, the Y signal of the captured image data in the YUV format. If the Y signal is expressed by 8 bits, i.e., within a decimal range of 0 to 255, for example, the Y signal is adjusted to around 127, which is a middle value. At that time, the Y signal is adjusted so that each of RGB values is contained in a domain after conversion into the RGB format. If each of RGB signals is expressed by 8 bits, and the following RGB-YUV conversion equation is used, the luminance conversion unit 204 adjusts the Y signal so that each of the RGB signals is contained within the decimal range of 0 to 255.

$$R = Y + 1.40200V$$

$$G = Y - 0.344114U - 0.71414V$$

$$B = Y + 1.77200U$$

Desirably, a value that makes the captured image data not too bright and not too dark, and visually comfortable is selected as an adjustment value of the Y signal, and this value is determined in consideration of the captured target, the environment under which the captured image data is observed, the application, and the like. The format of the image data is converted if necessary, before and after the luminance conversion. The luminance conversion processing here means a brightness adjustment performed on a digital signal level.

The color conversion unit 205 converts a color temperature of the captured image data. The color conversion unit 205 makes an adjustment so that, for example, a ratio among RGB signal intensities becomes 1:1:1 in the captured image data in the RGB format. The adjusted ratio among RGB signals may be a ratio corresponding to a color temperature defined by a standard such as standard RGB (sRGB) selected in consideration of the environment under which the captured image data is observed, the application, and the like. A method for calculating the color temperature from the ratio among RGB signal intensities will be described below with reference to FIG. 3. The format of the captured image data is converted if necessary, before and after the color conversion. The color conversion by the color conversion unit 205 means a white balance adjustment performed on the digital signal level.

As illustrated in FIG. 2, the local illumination environment processing unit 107 includes an illumination environment information processing unit 206, an image identification information extraction unit 207, a timing adjustment unit 208, an image storage unit 209, a luminance conversion unit 210, and a color conversion unit 211.

The illumination environment information processing unit 206 includes a storage unit (not illustrated) for storing illumination environment information, and sequentially stores therein the illumination environment information input from the illumination environment information extraction unit 202. Further, image identification information is input from the timing adjustment unit 208 into the illumination environment information processing unit 206, by which the illumination environment information processing unit 206 reads out illumination environment information corresponding to this image identification information, and outputs a readout success signal (Acknowledgement (ACK)) to the timing adjustment unit 208. In addition thereto, the illumination environment information processing unit 206 outputs the image identification information and the luminance information contained in the illumination environment information to the luminance conversion unit 210, and outputs the image identification information and the color temperature information contained in the illumination environment information to the color conversion unit 211.

The image identification information extraction unit 207 extracts the image identification information from the mixed reality image data. This image identification information is the image identification information embedded in the captured image data by the illumination environment information extraction unit 202. The image identification information extracted from the mixed reality image data is output to the timing adjustment unit 208. Further, the image identification information extraction unit 207 bundles the mixed reality image data and the extracted image identification information together as one set, and stores them into the image storage unit 209.

The timing adjustment unit 208 outputs the image identification information input from the image identification information extraction unit 207 to the illumination environment information processing unit 206. The illumination environment information processing unit 206 outputs a readout success signal (ACK) to the timing adjustment unit 208, if succeeded in reading out illumination environment information corresponding to this image identification information. The timing adjustment unit 208 adjusts a timing of reading out the mixed reality image data from the image storage unit 209, after confirming the ACK. More specifically, the timing adjustment unit 208 adjusts the timing so that the mixed reality image data is read out from the image storage unit 209 at a timing at which it becomes possible to perform processing using the read illumination environment information by the luminance conversion unit 210. This adjustment allows the luminance conversion unit 210 and the color conversion unit 211 to sequentially perform the luminance conversion and the color conversion using the illumination environment information with a delay as short as possible.

The image storage unit 209 includes a line buffer or a frame buffer that stores the mixed reality image data. The image storage unit 209 stores the mixed reality image data together with the image identification information extracted by the image identification information extraction unit 207.

The luminance conversion unit 210 converts a luminance of the mixed reality image data. The content of the processing is similar to the luminance conversion of captured image data by the luminance conversion unit 204, but the luminance information in the illumination environment information is used as an adjustment value therefor. The luminance conversion unit 210 can also check an error by reading out the image identification information together with the mixed reality image data from the image storage unit 209, and comparing it with the image identification information of the illumination environment information. As a result of this luminance conversion, the luminance of the mixed reality image data becomes substantially equivalent to the luminance of the captured image data before the conversion processing performed by the luminance conversion unit 204.

The color conversion unit 211 converts a color temperature of the mixed reality image data. The content of the processing is similar to the color conversion of captured image data by the color conversion unit 205, but the color conversion unit 211 adjusts RGB signals based on the color temperature information in the illumination environment information. The color conversion unit 211 can also check an error by inputting the image identification information together with the mixed reality image data from the luminance conversion unit 210, and comparing it with the image identification information of the illumination environment information. As a result of this color conversion processing, the color temperature of the mixed reality image data becomes substantially equivalent to the color temperature of the captured image data before the conversion processing performed by the color conversion unit 205.

The display unit 108 displays the input mixed reality image data while maintaining its brightness and tint. If the input mixed reality image data is dark, dark HMD observation image data is displayed. If the input mixed reality image data is bright, bright HMD observation image data is displayed. Further, if the input mixed reality image data has a high color temperature, displayed HMD observation image data also has a high color temperature. If the input mixed reality image data has a low color temperature, displayed HMD observation image data also has a low color temperature. The display unit 108 performs processing so as to restrain a characteristic specific to the display device by a display device characteristic correction unit 212, which will be described below, and converts the mixed reality image data input into the display unit 108 into HMD observation image data. The display device 108 includes the display device characteristic correction unit 212. The display device characteristic correction unit 212 corrects a characteristic depending on an individual display device.

Figure 3:
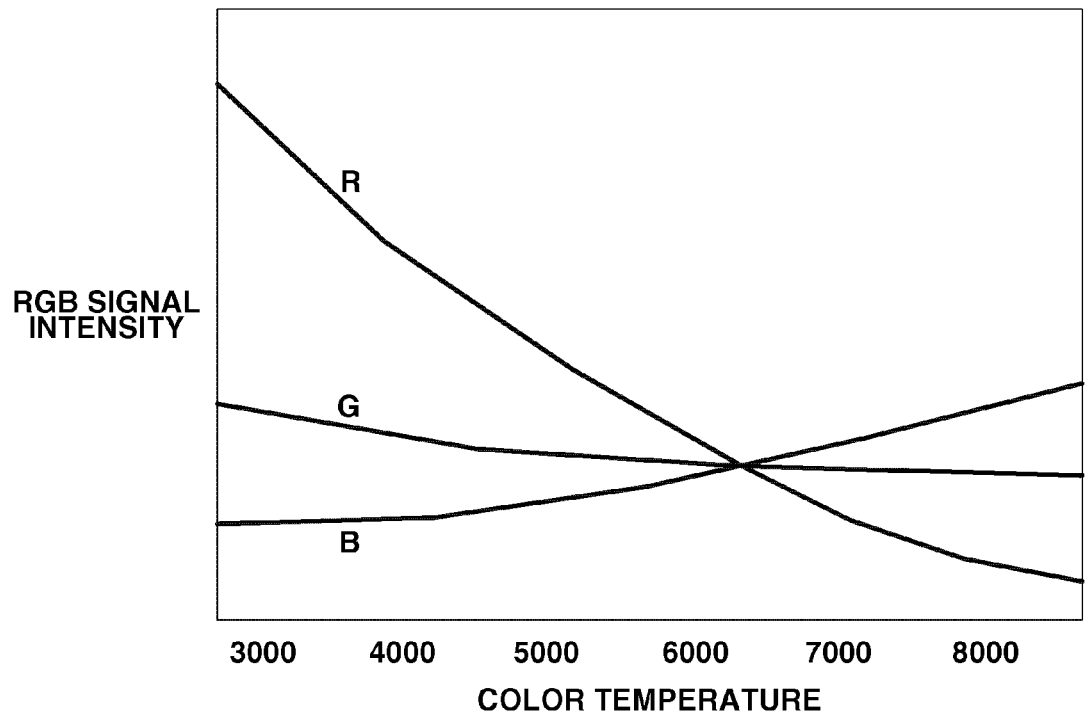
FIG. 3 illustrates a graph indicating a corresponding relationship between Red-Green-Blue (RGB) signal intensities in an RGB image format and a color temperature.

FIG. 3 illustrates a graph indicating a corresponding relationship between RGB signal intensities in the RGB image format and a color temperature. A color temperature 6500K is set as a reference, and an RGB signal gain is adjust so that an RGB signal ratio becomes 1:1:1 when a white plate is imaged under the color temperature 6500K. This is referred to as a white RGB signal gain under the reference color temperature 6500K. FIG. 3 illustrates the relationship of RGB signal intensities to each color temperature when the same white plate is imaged under various color temperatures, while maintaining this RGB signal gain. For calculating a color temperature under various kinds of environments of the external world, first, RGB signal intensities are calculated using the white RGB signal gain under the reference color temperature 6500K. Next, a color temperature can be acquired from the ratio among these RGB signal intensities and the corresponding relationship illustrated in FIG. 3. If the ratio between R/G and B/G is 4:1, the color temperature is approximately 3500K according to the graph in FIG. 3. The ratio is used at this time in consideration of an influence of a bias applied to the whole RGB signal intensities depending on a degree of brightness of image data, but the color temperature can be acquired from RGB signal intensities as long as the luminance is adjusted in advance. The method described with reference to FIG. 3 is a method for calculating a color temperature from a ratio among RGB signal intensities, and is merely an example of a method for calculating a color temperature from image data.

Figure 4:
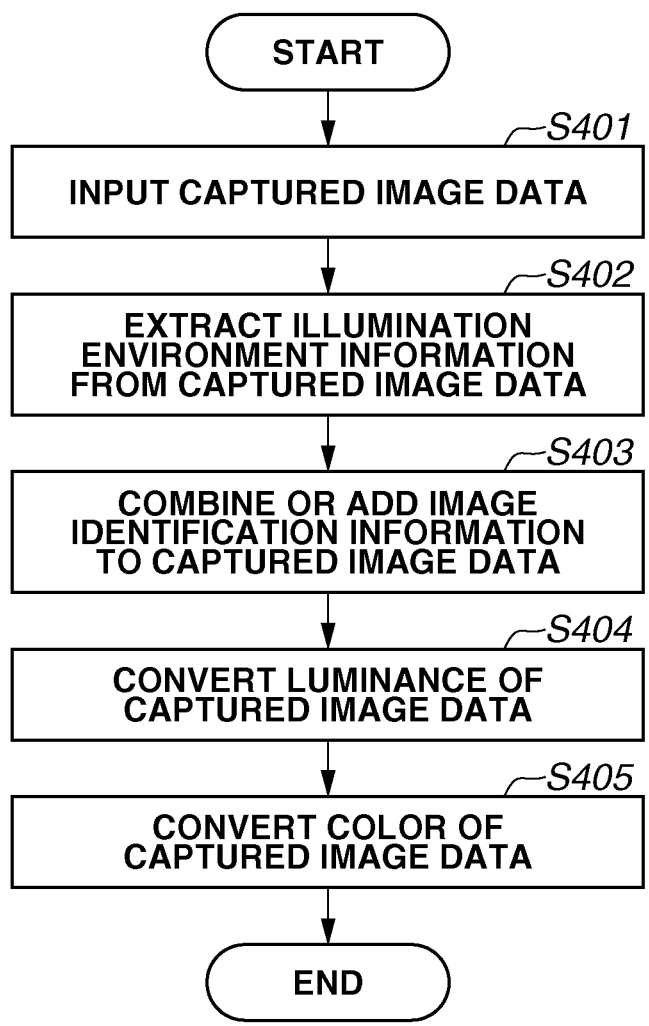
FIG. 4 is a flowchart illustrating processing performed by the standard illumination environment processing unit in the video see-through HMD according to the first exemplary embodiment.

FIG. 4 is a flowchart illustrating processing performed by the standard illumination environment processing unit 104 in the video see-through HMD 101. In the following description, the processing by the standard illumination environment processing unit 104 will be described with reference to FIG. 4. A central processing unit (CPU) in the video see-through HMD 101 reads out a required program and required data from a recording medium such as a read only memory (ROM) to execute the program, by which the processing illustrated in FIG. 4, and the processing illustrated in FIGS. 5 and 6 that will be described below are realized.

In step S401, the illumination environment information extraction unit 202 inputs captured image data from the imaging device characteristic correction unit 201 of the imaging unit 103. In step S402, the illumination environment information extraction unit 202 extracts illumination environment information that contains color temperature information and luminance information from the input captured image data. The extracted illumination environment information is output to the illumination environment information processing unit 206 together with image identification information from the image identification information source 203.

In step S403, the illumination environment information extraction unit 202 combines or adds the image identification information supplied from the image identification information source 203 to the captured image data. The illumination environment information extraction unit 202 may combine the image identification information to the captured image data by the electronic watermark technique, or may add the image identification information to a header of the captured image data. The captured image data with the image identification information combined or added thereto is output to the luminance conversion unit 204.

In step S404, the luminance conversion unit 204 converts a luminance of the captured image data. The captured image data after the luminance conversion is output to the color conversion unit 205. In step S405, the color conversion unit 205 converts a color of the captured image data. The captured image data after the color conversion is output to the image output unit 105 in the video see-through HMD 101.

Figure 5:
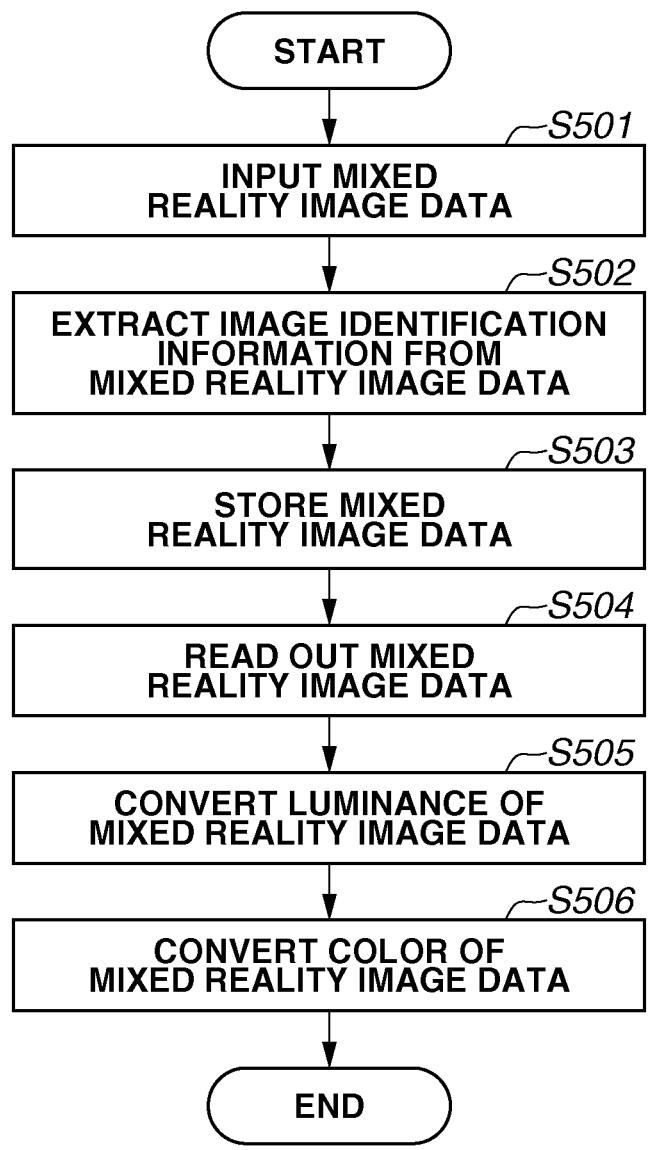
FIG. 5 is a flowchart illustrating a flow of image data in the local illumination environment processing unit 107 according to the first exemplary embodiment.

Next, processing performed by the local illumination environment processing unit 107 in the video see-through HMD 101 will be described with reference to FIGS. 5 and 6. FIG. 5 is a flowchart illustrating a flow of image data in the local illumination environment processing unit 107.

In step S501, the image identification information extraction unit 207 inputs mixed reality image data from the image input unit 106. In step S502, the image identification information extraction unit 207 extracts image identification information from the mixed reality image data. The mixed reality image data, from which the image identification information is extracted, is output to the image storage unit 209 together with the image identification information. Further, the extracted image identification information is also output to the timing adjustment unit 208.

In step S503, the image storage unit 209 stores the image identification information and the mixed reality image data in association with each other. In step S504, the luminance conversion unit 210 reads out the mixed reality image data from the image storage unit 209. More specifically, in response to an input of the image identification information and an image readout permission from the timing adjustment unit 208, the image storage unit 209 makes mixed reality image data corresponding to this image identification information ready for being read out from the image storage unit 209. The luminance conversion unit 210 reads out this display image data, once the mixed reality image data becomes ready for being read out from the image storage unit 209.

In step S505, the luminance conversion unit 210 converts a luminance of the mixed reality image data. The luminance conversion unit 210 uses the luminance information contained in the illumination environment information from the illumination environment information processing unit 206 as an adjustment value. The display image data after the luminance conversion is output to the color conversion unit 211. In step S506, the color conversion unit 211 converts a color of the display image data. More specifically, the color conversion unit 211 adjusts RGB signals based on the color temperature information contained in the illumination environment information from the illumination environment information processing unit 206. The display image data after the color conversion is output to the display device characteristic correction unit 212 of the display unit 108.

Figure 6:
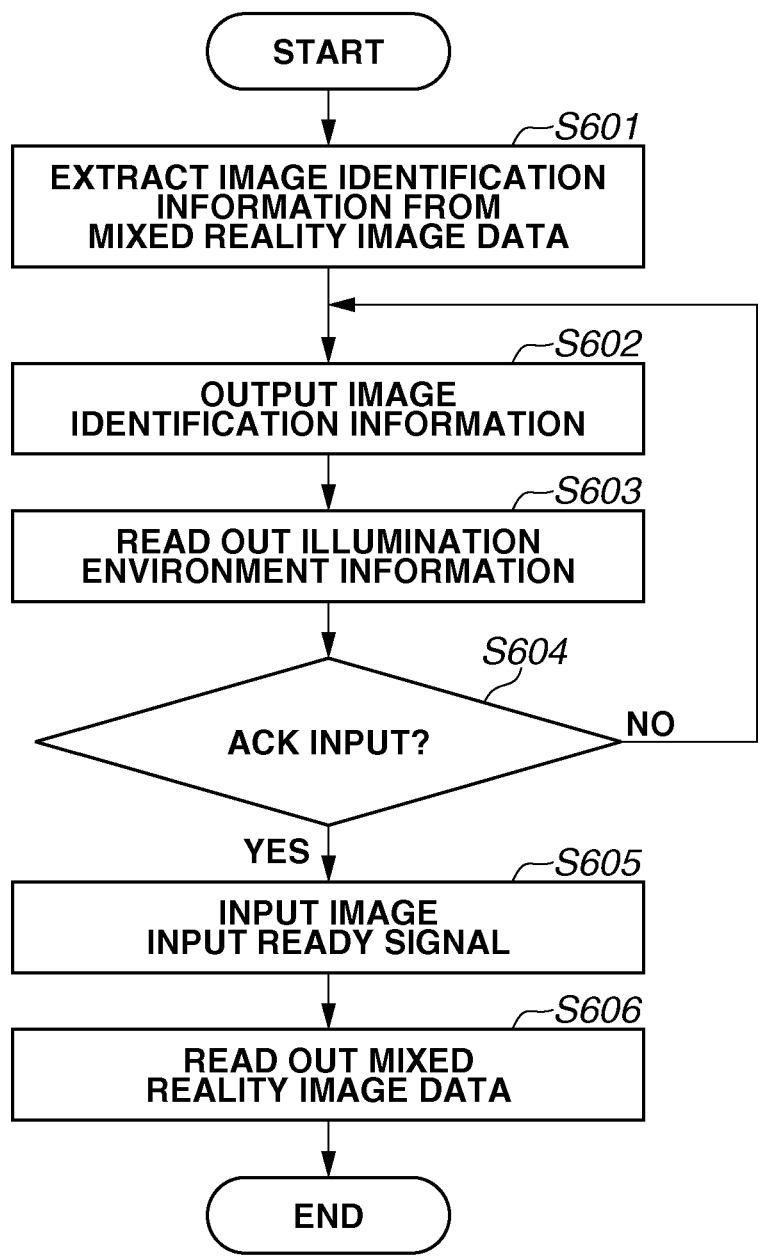
FIG. 6 is a flowchart illustrating timing adjustment processing performed by the local illumination environment processing unit 107 in the video see-through HMD according to the first exemplary embodiment.

FIG. 6 is a flowchart illustrating timing adjustment processing performed by the local illumination environment processing unit 107 of the video see-through HMD 101.

In step S601, the image identification information extraction unit 207 extracts the image identification information from the mixed reality image data. The extracted image identification information is output to the timing adjustment unit 208. In step S602, the timing adjustment unit 208 outputs the image identification information input from the image identification information extraction unit 207 to the illumination environment information processing unit 206.

In step S603, the illumination environment information processing unit 206 reads out illumination environment information corresponding to the image identification information input from the timing adjustment unit 208, from the storage unit thereof. The illumination environment information processing unit 206 stores the image identification information and the illumination environment information input from the illumination environment information extraction unit 202 in a state bundled as one set. If the illumination environment information processing unit 206 succeeds in reading out the illumination environment information, the illumination environment information processing unit 206 outputs a readout success signal (ACK) to the timing adjustment unit 208. The illumination environment information processing unit 206 outputs the illumination environment information and the image identification information to each of the luminance conversion unit 210 and the color conversion unit at the same time as the output of the ACK.

In step S604, the timing adjustment unit 208 determines whether an ACK is input. If an ACK is not input even after a time-out time period has elapsed (NO in step S604), the processing returns to step S602. Then, the timing adjustment unit 208 outputs image identification information of mixed reality image data one frame before the current frame to the illumination environment information processing unit 206. On the other hand, if an ACK is input within the time-out time period (YES in step S604), the processing proceeds to step S605.

In step S605, the luminance conversion unit 210 outputs an image input ready signal to the timing adjustment unit 208 together with the image identification information at a timing at which it becomes possible to perform the luminance conversion processing using the illumination environment information from the illumination environment information processing unit 206.

In step S606, by being triggered by an input of the image identification information and the image input ready signal, the timing adjustment unit 208 transmits a permission for reading out mixed reality image data corresponding to this image identification information to the image storage unit 209. The luminance conversion unit 210 reads out the mixed reality image data, once it becomes possible to read out the image from the image storage unit 209.

By the above-described processing from step S601 to step S606, the luminance conversion unit 210 and the color conversion unit 211 can sequentially perform the luminance conversion processing and the color conversion processing using the illumination environment information with a delay as short as possible.

Figure 7:
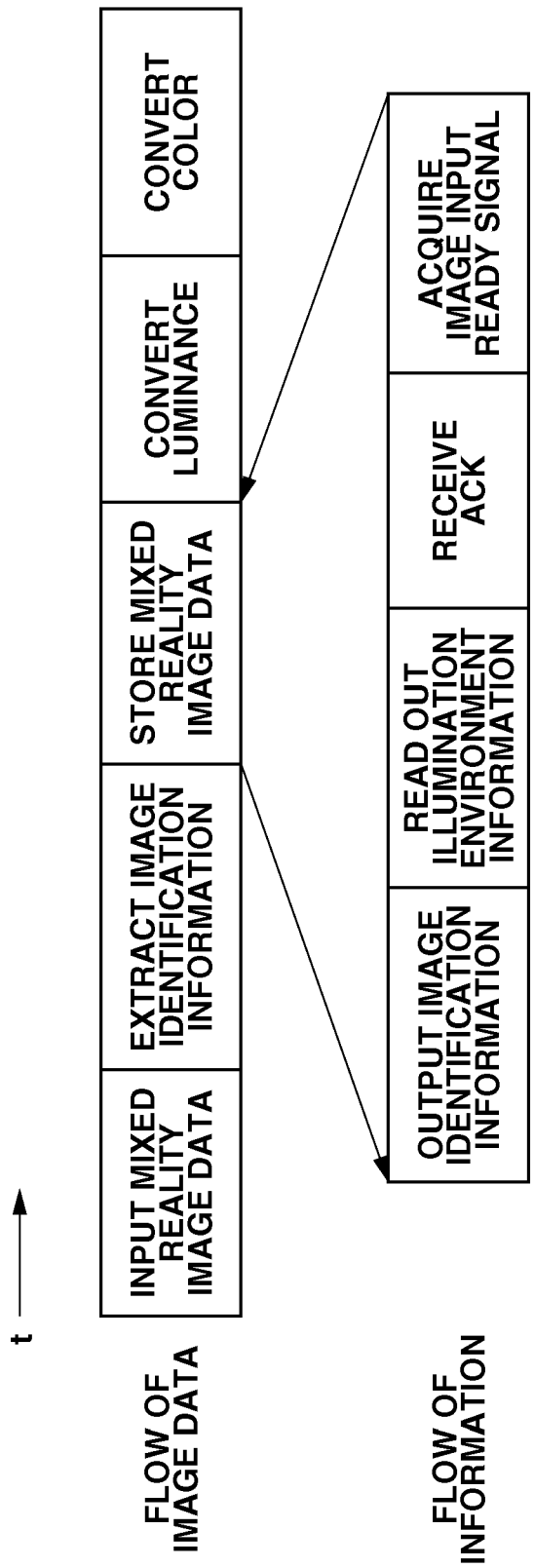
FIG. 7 is a time chart indicating a temporal relationship between a flow of image data and a flow of information in local illumination environment processing according to the first exemplary embodiment.

FIG. 7 is a time chart indicating a temporal relationship between a flow of image data and a flow of information in the local illumination environment processing according to the first exemplary embodiment. As illustrated in FIG. 7, according to the present exemplary embodiment, mixed reality image data is input into the image identification information extraction unit 207, and image identification information is extracted from this mixed reality image data. Thereafter, the mixed reality image data is stored into the image storage unit 209. While the mixed reality image data is stored into the image storage unit 209, the following processing is performed. The image identification information of this mixed reality image data is output from the timing adjustment unit 208. Illumination environment information corresponding to this image identification information is read out by the illumination environment information processing unit 206. Further, an ACK is input into the timing adjustment unit 208, and an image input ready signal is acquired by the timing adjustment unit 208. Then, after the mixed reality image data is stored into the image storage unit 209 and the image input ready signal is acquired by the timing adjustment unit 208, the luminance and the color are converted by the luminance conversion unit 210 and the color conversion unit 211, respectively.

FIGS. 8A, 8B, 8C, and 8D illustrate data structures of the illumination environment information. As illustrated in FIG. 8A, the illumination environment information includes the image identification information (date/time information), the color temperature information, and the luminance information.

FIG. 8B illustrates an example of a data structure of the image identification information (the date/time information). As illustrated in FIG. 8B, the image identification information (the date/time information) is information that indicates when captured image data is captured, and is mainly divided into date information and time information. The date information includes year according to the Western calendar, month, and day. The time information includes hour, minute, second, and millisecond. FIG. 8B illustrates a structure example of 40 bits in total.

The image identification information (the date/time information) only has to be information that allows identification of image data from the time when captured image data is captured to the time when virtual image data is superimposed onto this captured image data. Therefore, as described above, if this time interval corresponds to 10 frames, the image identification information only has to be information that allows image data pieces of the 10 frames to be identified, respectively. However, actually, the data structure of the image identification information is determined in consideration of factors such as a variation in a time period required to generate virtual image data, and a possibility that the image identification information is also used as attribute information of the captured image data. For example, if the above-described time interval during which image data should be identified is not a constant interval from about 120 frames to about 180 frames due to a variation in the time period required to generate virtual image data, it is desirable that the image identification information has a data structure having a margin, for example, a data structure that allows image data pieces of 240 frames to be identified, respectively. If the image identification information is also used as attribute information of the captured image data, it is desirable that the image identification information has such a data structure that attribute information such as a resolution, an image format, and a shutter speed is added to the data structure illustrated in FIG. 8B. FIGS. 8C and 8D illustrate examples of data structures of the color temperature information and the luminance information, respectively. The color temperature information is information that indicates a color temperature itself, as illustrated in FIG. 8C. The luminance information is information that indicates a Y signal when image data is expressed in the YUV format, as illustrated in FIG. 8D.

FIGS. 9A, 9B, 9C, and 9D illustrate what kind of characteristics an imaging device and a display device have. Representative examples of the imaging device characteristic include a receivable light frequency characteristic and a sensitivity characteristic.

FIG. 9A illustrates an example of the receivable light frequency characteristic of the imaging device. The characteristic of frequency of light receivable by the imaging device varies for each imaging device due to influences of absorption and scattering of a color filter and a peripheral member used in the imaging device. This affects a tint of captured image data.

FIG. 9B illustrates an example of the sensitivity characteristic of the imaging device. Suppose that the imaging device has a Bayer array, and measures signal outputs (VGr, VGb, VR, and VB) at a center of a screen when a white object is imaged. A gain of an electric signal is to be adjusted so that, if a light intensity of each RGB single color is the same, an intensity of an electric signal after photoelectric conversion becomes also the same for each RGB. This affects a luminance of captured image data.

The imaging device characteristic is not limited to the above-described receivable light frequency characteristic and sensitivity characteristic, and may be another element in the imaging unit 103 such as an infrared (IR) filter and an analog transmission characteristic. The imaging device characteristic correction unit 201 corrects a characteristic (a tint, a luminance, and the like) that depends on a component of the imaging unit 103.

Representative examples of the display device characteristic include an emittable light frequency characteristic and a luminance characteristic of a light source. FIG. 9C illustrates an example of the emittable light frequency characteristic of the light source. This example corresponds to emittable light frequencies of respective RGB colors when light-emitting diodes (LEDs) of RGB three colors are used as the light source. This affects a tint of mixed reality image data.

FIG. 9D illustrates an example of the luminance characteristic of the light source. A current supplied to the LED is to be adjusted for each RGB to adjust a light intensity of each RGB single color. This affects a luminance of mixed reality image data.

The display device characteristic is not limited to the above-described emittable light frequency characteristic and luminance characteristic of the light source, and may be another element in the display unit 108 such as a liquid-crystal filter characteristic of a display panel, and a lens characteristic. The display device characteristic correction unit 212 corrects a characteristic (a tint, a luminance, and the like) that depends on a component of the display unit 108.

In this manner, according to the present exemplary embodiment, mixed reality image data can be dynamically converted into image data that matches an illumination environment of an external world with use of illumination environment information extracted from captured image data. Therefore, brightness and color sensations felt by an HMD user to an ambient environment can substantially match an actual environment of the external world, which allows the user to be further engrossed into a mixed reality space.

Further, captured image data output from the video see-through HMD 101 into the image processing apparatus 102 is image data in which the characteristics depending on the imaging device are canceled, and a brightness and a white balance are adjusted. Therefore, the present exemplary embodiment has advantages of compliance with a basic idea of color matching, facilitation of marker extraction from captured image data to detect a position and an orientation, elimination of the necessity of changing a color temperature and a luminance of the light source during drawing of virtual image data for each system, a reduction in loss in image data due to compression, and the like. Further, the characteristics depending on the display device are canceled from mixed reality image data in the display unit 108, which allows formation of image data according to a standard that does not depend on the display device. Further, the present exemplary embodiment does not require an additional sensor different from the components of the video see-through HMD 101 itself, and utilizes a corresponding relationship between captured image data and mixed reality image data, thereby simplifying the configuration.

Figure 10:
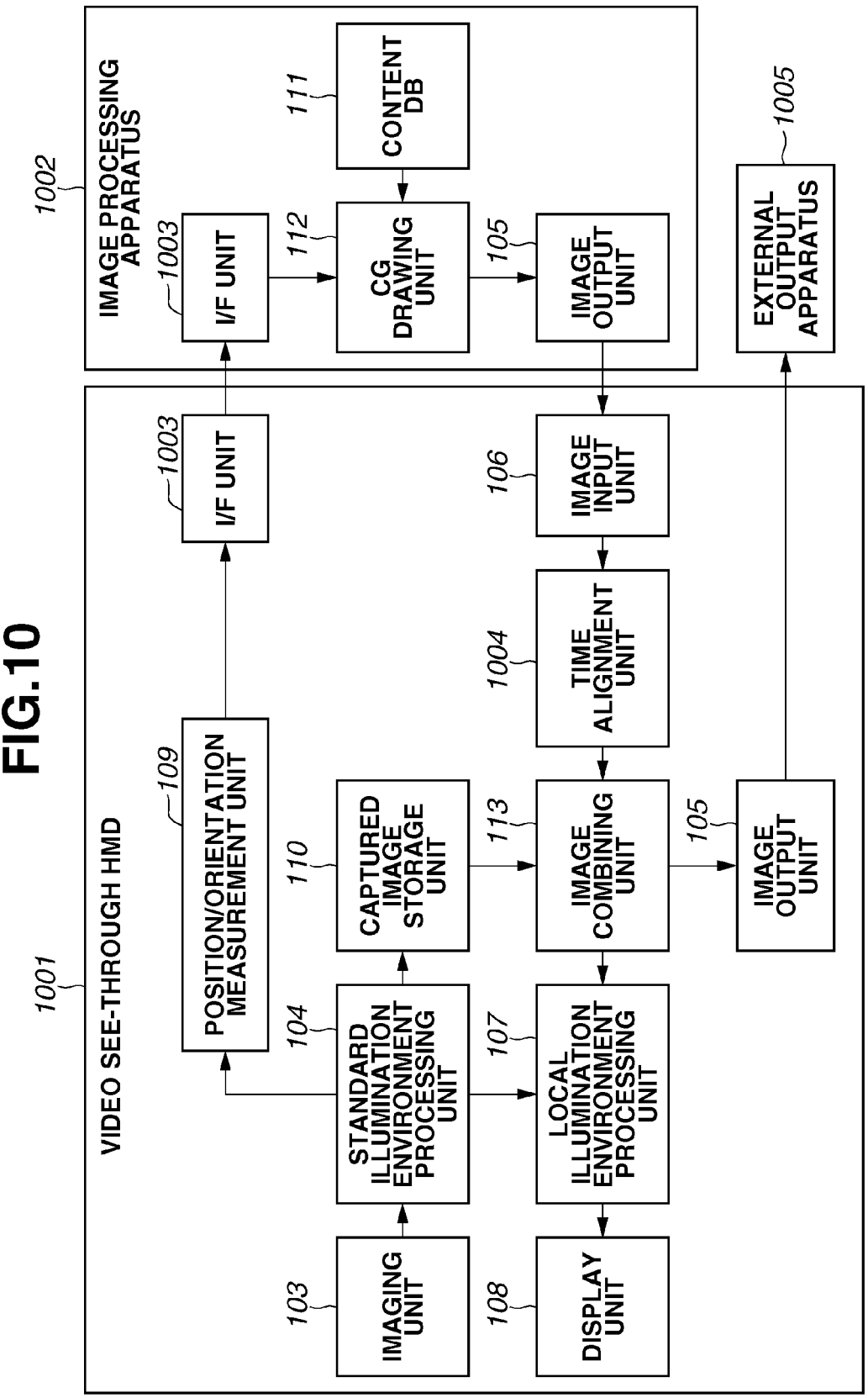
FIG. 10 is a block diagram illustrating a functional configuration of a mixed reality system using a video see-through HMD according to a second exemplary embodiment.

Next, a second exemplary embodiment of the present invention will be described. FIG. 10 is a block diagram illustrating a functional configuration of a mixed reality system using a video see-through HMD 1001 according to the second exemplary embodiment. Referring to FIG. 10, the mixed reality system includes the video see-through HMD 1001 according to the second exemplary embodiment. The video see-through HMD 1001 includes the imaging unit 103, the standard illumination environment processing unit 104, the captured image storage unit 110, the image input unit 106, a time alignment unit 1004, the image combining unit 113, the local illumination environment processing unit 107, the display unit 108, the position/orientation measurement unit 109, an interface (I/F) unit 1003, and the image output unit 105.

Further, Referring to FIG. 10, the mixed reality system includes an image processing apparatus 1002. The image processing apparatus 1002 includes the I/F unit 1003, the content DB 111, the CG drawing unit 112, and the image output unit 105. The image processing apparatus 1002 can be embodied by an apparatus that has a high-performance calculation processing function and graphics generation/display function, such as a personal computer and a workstation. The mixed reality system further includes an external output apparatus 1005. This is a display apparatus such as a plasma display panel (PDP), an organic electroluminescence (EL) display, and a liquid-crystal display. In FIG. 10, units similar to those in FIG. 1 are labeled in a similar manner to FIG. 1.

According to the first exemplary embodiment, captured image data is output from the video see-through HMD 101 to the image processing apparatus 102. On the other hand, according to the second exemplary embodiment, position/orientation information and image identification information are output from the video see-through HMD 1001 to the image processing apparatus 1002, and captured image data and the image identification information are bundled together to be stored as one set into the captured image storage unit 110 of the video see-through HMD 1001. The first exemplary embodiment has such an advantage that the video see-through HMD 101 can be simply configured, because the first exemplary embodiment can be realized by using functions of an existing image processing apparatus. On the other hand, the second exemplary embodiment has such advantages that a communication amount can be reduced between the video see-through HMD 1001 and the image processing apparatus 1002, and a delay due to an output of image data can be reduced.

The image processing apparatus 1002 generates virtual image data from the position/orientation information, and outputs the virtual image data to the video see-through HMD 1001 together with the image identification information. The image identification information is embedded in the virtual image data by the electronic watermark technique, or is added to a header of the virtual image data. The captured image data and the virtual image data are combined within the video see-through HMD 1001, and mixed reality image data, which is the combined image data therefrom, is displayed on the display unit 108

Because captured image data and virtual image data are combined within the video see-through HMD 1001, time alignment processing for eliminating a time lag between the captured image data and the virtual image data has to be performed in the video see-through HMD 1001. Therefore, according to the second exemplary embodiment, the time alignment unit 1004 is newly provided so as to allow the image combining unit 113 to combine captured image data and virtual image data that coincides with the captured image data on a temporal axis. The time alignment unit 1004 performs time alignment processing for the local illumination environment processing unit 107, in addition to time alignment processing for the image combining unit 113.

According to the second exemplary embodiment, the video see-through HMD 1001 includes the image combining unit 113, whereby the second exemplary embodiment is configured in such a manner that mixed reality image data is held only by the video see-through HMD 1001. Further, mixed reality image data is output from the image combining unit 113 to not only the local illumination environment processing unit 107 but also the image output unit 105, to allow another person than an HMD user to also observe the mixed reality image data. The mixed reality image data is output from the image output unit 105 to the external output apparatus 1005. With this configuration, image data that does not depend on an observation environment of the HMD user can be output to the external output apparatus 1005 as mixed reality image data. Preparing mixed reality image data as image data according to the sRGB standard or the like allows the external output apparatus 1005 to convert this data into image data suitable for its observation environment.

Figure 11:
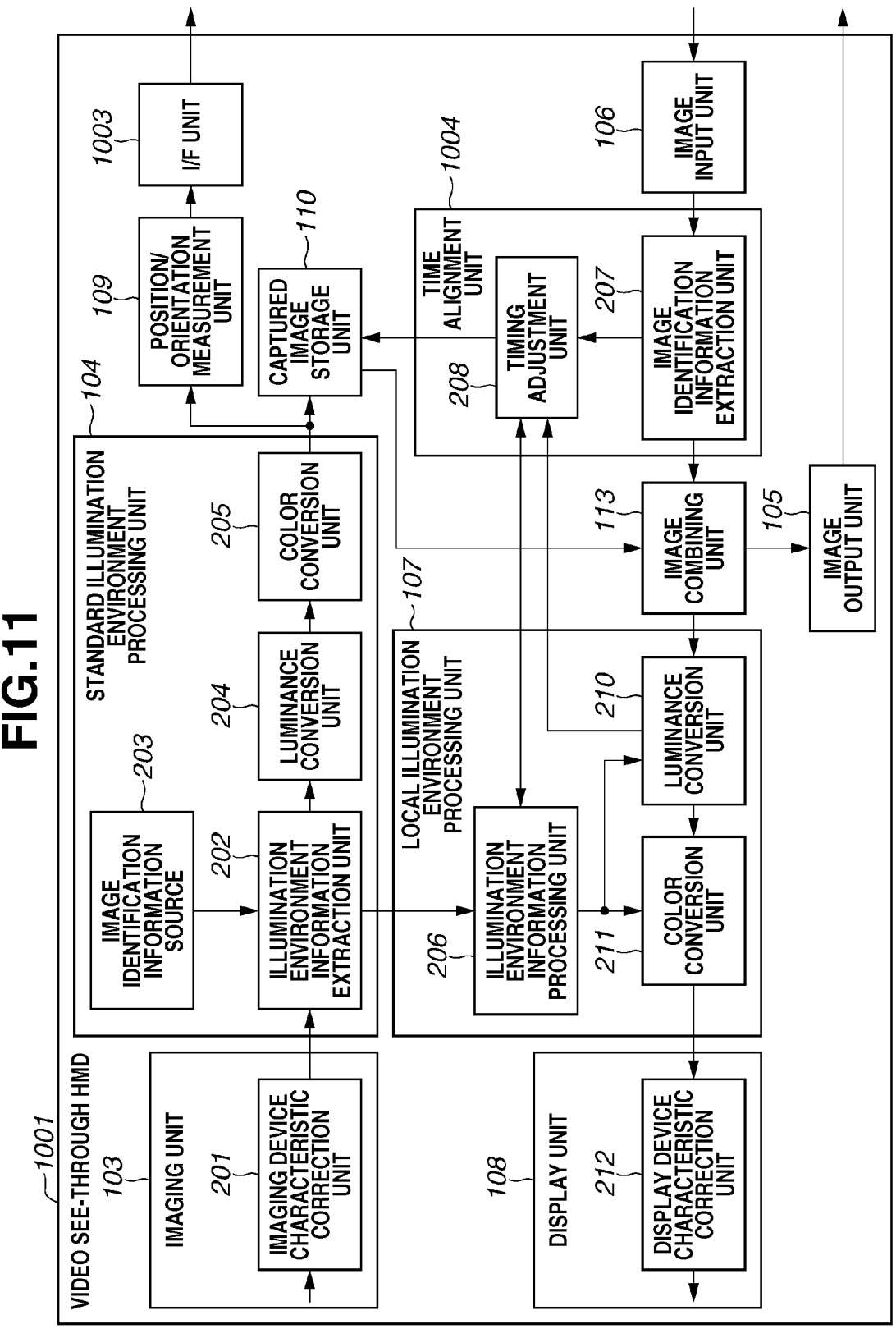
FIG. 11 is a block diagram illustrating a further detailed configuration of the video see-through HMD according to the second exemplary embodiment.

FIG. 11 is a block diagram illustrating a further detailed configuration of the video see-through HMD 1001 according to the second exemplary embodiment. In FIG. 11, units similar to those in FIG. 2 are labeled in a similar manner to FIG. 2.

Referring to FIG. 11, the imaging unit 103 has a function similar to the imaging unit 103 illustrated in FIG. 2. The standard illumination environment processing unit 104 includes the illumination environment information extraction unit 202, the image identification information source 203, the luminance conversion unit 204, and the color conversion unit 205. The image identification information source 203, the luminance conversion unit 204, and the color conversion unit 205 have functions similar to the image identification information source 203, the luminance conversion unit 204, and the color conversion unit 205 illustrated in FIG. 2, respectively.

The illumination environment information extraction unit 202 extracts illumination environment information that contains color temperature information and luminance information from captured image data by performing image processing, and outputs the extracted illumination environment information to the local illumination environment processing unit 107 together with image identification information from the image identification information source 203. In addition thereto, the illumination environment information extraction unit 202 adds the image identification information to the captured image data, and outputs this captured image data to the luminance conversion unit 204. The present exemplary embodiment is configured so as not to transmit the captured image data from the video see-through HMD 1001 to the image processing apparatus 1002. Therefore, it is desirable to handle the image identification information as different information from the captured image data instead of embedding the image identification information into the captured image data, in consideration that the image identification information is stored together with the captured image data as one set into the captured image storage unit 110, which is a later stage.

The captured image storage unit 110 stores image identification information and captured image data corresponding to this image identification information as one set. The position/orientation measurement unit 109 extracts a marker and/or a natural feature from the captured image data input from the standard illumination environment processing unit 104, and measures position/orientation information at a line-of-sight position of the HMD user. The position/orientation measurement unit 109 bundles the measured position/orientation information and image identification information corresponding to this position/orientation information together as one set, and outputs them to the I/F unit 1003. The I/F unit 1003 transmits the position/orientation information and the image identification information bundled together as one set to the image processing apparatus 1002.

The local illumination environment processing unit 107 includes the illumination environment information processing unit 206, the luminance conversion unit 210, and the color conversion unit 211. In FIG. 2, the image identification information extraction unit 207 and the timing adjustment unit 208 are provided as components of the local illumination environment processing unit 107. In FIG. 11, they are provided in another block as the time alignment unit 1004. The local illumination environment processing unit 107 has a function and a processing content similar to FIG. 2, only in terms of the local illumination environment processing. However, the time alignment unit 1004 configured as an independent block in FIG. 11 is extended so as to function even in time alignment processing for the image combining processing by the image combining unit 113.

The time alignment unit 1004 includes the image identification information extraction unit 207 and the timing adjustment unit 208. The time alignment unit 1004 performs not only the time alignment processing for the image combining unit 113 but also the time alignment processing for the local illumination environment processing unit 107.

The image identification information extraction unit 207 extracts image identification information from virtual image data. This image identification information is the image identification information added to the captured image data by the illumination environment information extraction unit 202. The extracted image identification information is output to the timing adjustment unit 208. Further, the virtual image data is output to the image combining unit 113 together with the extracted image identification information.

The image combining unit 113 receives the output virtual image data and reads out captured image data corresponding to the image identification information thereof from the captured image storage unit 110, and then combines the virtual image data and the captured image data. Mixed reality image data after the combining processing is output to the luminance conversion unit 210 and the image output unit 105.

Figure 12:
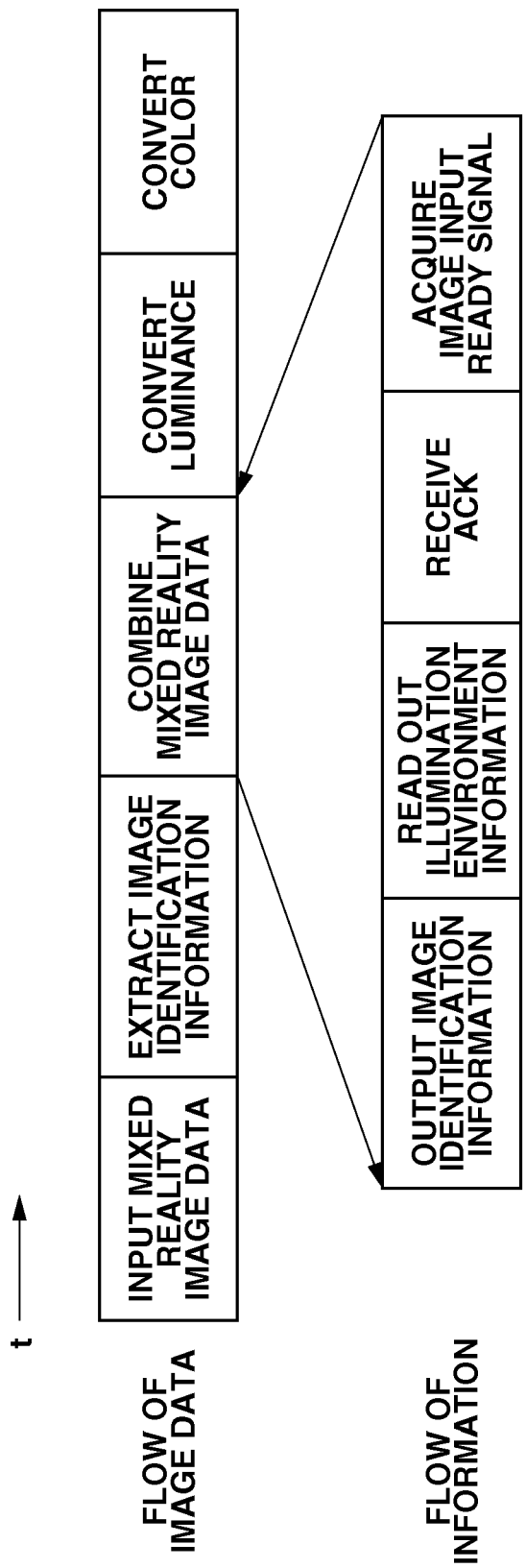
FIG. 12 is a time chart indicating a temporal relationship between a flow of image data and a flow of information in image combining processing and local illumination environment processing according to the second exemplary embodiment.

FIG. 12 is a time chart indicating a temporal relationship between a flow of image data and a flow of information in the image combination processing and the local illumination environment processing according to the second exemplary embodiment. As illustrated in FIG. 12, at a timing when virtual image data and captured image data are combined by the image combining unit 113, the following processing is performed. Image identification information of the mixed reality image data is output by the timing adjustment unit 208. Illumination environment information corresponding to this image identification information is read out by the illumination environment information processing unit 206. Further, an ACK is input into the timing adjustment unit 208, and an image input ready signal is acquired by the timing adjustment unit 208. This is a difference from the first exemplary embodiment.

According to the present exemplary embodiment, mixed reality image data output from the video see-through HMD 1001 into the external output apparatus 1005 is image data in which the characteristics depending on the device are canceled, and a brightness and a white balance are adjusted. Therefore, mixed reality image data according to a standard that does not depend on the display device can be output. The present exemplary embodiment complies with a basic idea of color matching, thereby having an advantage of being able to provide a display suitable for an external environment and a device characteristic of the external output apparatus 1005.

Figure 13A:
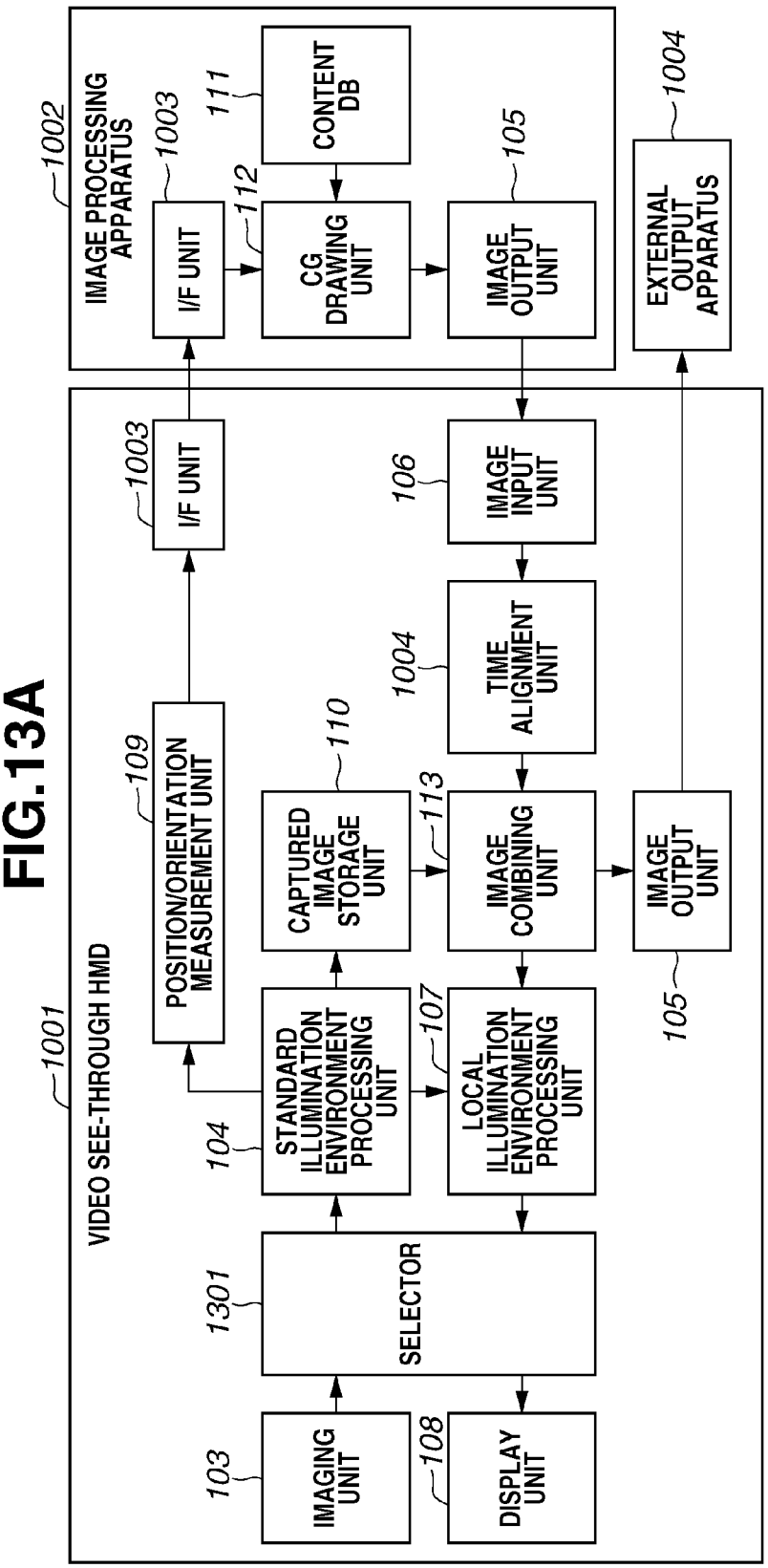
FIGS. 13A and 13B are block diagrams illustrating a modification of the mixed reality system according to the second exemplary embodiment.
Figure 13B:
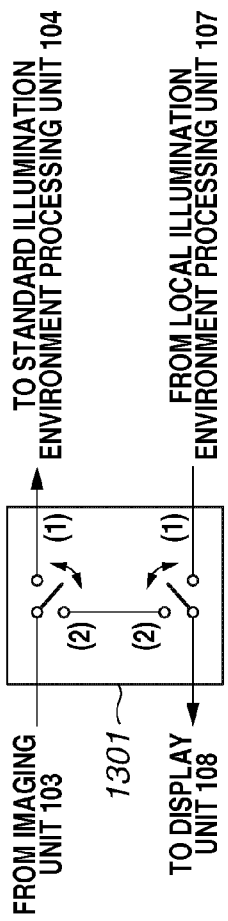

FIGS. 13A and 13B are block diagrams illustrating a modification of the mixed reality system according to the second exemplary embodiment. More specifically, FIG. 13A illustrates a configuration of the modification of the mixed reality system according to the second exemplary embodiment, and FIG. 13B illustrates switching processing by a selector 1301. The mixed reality system illustrated in FIG. 13A corresponds to the configuration of the mixed reality system illustrated in FIG. 10 with the selector 1301 added thereto.

For displaying only captured image data on the video see-through HMD 1001 instead of displaying mixed reality image data, the selector 1301 is switched to (2) illustrated in FIG. 13B, thereby changing a data flow so as to transmit image data from the imaging unit 103 to the display unit 108. At that time, the mixed reality system can be switched to a low power consumption mode with the components other than the imaging unit 103, the selector 1301, and the display unit 108 substantially stopping working. The imaging unit 103 performs processing that enables an environment of captured image data to match an environment of an external world, and the display unit 108 displays the input mixed reality image data while maintaining its luminance and tint, thereby allowing an HMD user to observe an image that matches the environment of the external world. Further, for superimposing virtual image data onto captured image data, the selector 1301 is switched to (1) illustrated in FIG. 13B. In this case, the mixed reality system according to the modification has functions and processing similar to the mixed reality system according to the second exemplary embodiment illustrated in FIG. 10.

In this manner, if only captured image data is displayed on the video see-through HMD 101 without superimposing virtual image data thereon, mixed reality image data can be dynamically adjusted to image data that matches an illumination environment of an external world. Further, a delay in the processing of the system, a processing load, and power consumption can be reduced.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-074267 filed Mar. 29, 2013, which is hereby incorporated by reference herein in its entirety.

What is claimed is:

1. An image processing apparatus comprising:
a computer-readable memory; and
one or more processors that are coupled to the computer-readable memory and that are configured to cause the image processing apparatus to implement:
an obtaining unit configured to obtain illumination environment information, which indicates an illumination environment of a real space, from image data imaged by an imaging unit;
a first conversion unit configured to convert the image data into standard image data based on the illumination environment information;
a generating unit configured to generate standard mixed reality image data by combining the standard image data and virtual image data;
a second conversion unit configured to convert, based on the illumination environment information, the standard mixed reality image data generated by the generating unit into mixed reality image data corresponding to the illumination environment of the real space; and
an output unit configured to output the mixed reality image data corresponding to the illumination environment of the real space, which is obtained by converting the standard mixed reality image data by the second conversion unit.

2. The image processing apparatus according to claim 1, wherein the obtaining unit obtains, as the illumination environment information, color temperature information based on a ratio among RGB signal intensities of the image data.

3. The image processing apparatus according to claim 2, wherein the first conversion unit converts, based on the obtained color temperature information, the RGB signal intensities of the image data so that a color temperature of the image data becomes equal to a predetermined color temperature of the standard image data, and
wherein the second conversion unit converts, based on the obtained color temperature information, RGB signal intensities of the mixed reality image data so that a color temperature of the mixed reality image data becomes equal to the color temperature of the image data.

4. The image processing apparatus according to claim 1, wherein the obtaining unit obtains, as the illumination environment information, luminance information included in the image data.

5. The image processing apparatus according to claim 4, wherein the first conversion unit converts, based on the obtained luminance information, luminance of the image data so that the luminance of the image data becomes equal to a predetermined luminance, and
wherein the second conversion unit converts, based on the obtained luminance information, luminance of the mixed reality image data so that the luminance of the mixed reality image data becomes equal to the luminance of the image data.

6. The image processing apparatus according to claim 1, wherein the obtaining unit further combines or adds identification information of the image data with or to the image data,
wherein the first conversion unit converts the image data, which includes, as a result of the combining or the adding, the identification information of the image data, into the standard image data including the identification information of the image data,
wherein the generating unit generates the standard mixed reality image data including the identification information of the image data by combining the standard image data including the identification information of the image data with the virtual image data, and wherein the second conversion unit converts the generated standard mixed reality image data, which includes the identification information of the image data, based on the illumination environment information of which identification information corresponds to the identification information of the image data.

7. The image processing apparatus according to claim 6, wherein the identification information contains information that indicates when the image data is imaged by the imaging unit.

8. The image processing apparatus according to claim 1, wherein the one or more processors are further configured to cause the image processing apparatus to implement a measurement unit configured to measure a position/orientation of the imaging unit based on a feature, which is extracted from the standard image data, of the real space,
   wherein the virtual image data is image data generated based on the position/orientation measured by the measurement unit.

9. The image processing apparatus according to claim 1, wherein the imaging unit is mounted on a head mounted display apparatus.

10. The apparatus according to claim 1, further comprising a first correction unit configured to perform, on the image data imaged by the imaging unit, correction processing of correcting a characteristic of the imaging unit,
    wherein the obtaining unit obtains the environment illumination information from the image data on which the correction processing has been performed by the first correction unit.

11. The apparatus according to claim 1, further comprising a second output unit configured to output the standard mixed reality image data generated by the generating unit, before conversion processing by the second conversion unit is performed on the standard mixed reality image data.

12. The apparatus according to claim 1, further comprising a second correction unit configured to perform, on the mixed reality image data obtained by converting the standard mixed reality image data generated by the generating unit and corresponding to the illumination environment of the real space, second correction processing of correcting a characteristic of a display unit on which the mixed reality image data is displayed.

13. An image processing method to be performed by an image processing apparatus, the method comprising:
    obtaining illumination environment information, which indicates an illumination environment of a real space, from image data imaged by an imaging unit;
    converting the image data into standard image data based on the illumination environment information;
    generating standard mixed reality image data by combining the standard image data and virtual image data;
    converting, based on the illumination environment information, the standard mixed reality image data into mixed reality image data corresponding to the illumination environment of the real space; and
    outputting the mixed reality image data corresponding to the illumination environment of the real space.

14. A non-transitory computer-readable medium storing a program for causing a computer to perform a method comprising:
    obtaining illumination environment information, which indicates an illumination environment of a real space, from image data imaged by an imaging unit; and
    converting the image data into standard image data based on the illumination environment information;
    generating standard mixed reality image data by combining the standard image data and virtual image data;
    converting, based on the illumination environment information, the standard mixed reality image data into mixed reality image data corresponding to the illumination environment of the real space; and
    outputting the mixed reality image data corresponding to the illumination environment of the real space.

* * * * *